United States Patent
Ishii et al.

(10) Patent No.: US 11,765,191 B2
(45) Date of Patent: Sep. 19, 2023

(54) INFORMATION PROCESSING DEVICE AND INFORMATION PROCESSING METHOD

(71) Applicant: Panasonic Intellectual Property Management Co., Ltd., Osaka (JP)

(72) Inventors: Kou Ishii, Osaka (JP); Kaoru Yokota, Hyogo (JP); Yuishi Torisaki, Osaka (JP); Toshihisa Nakano, Osaka (JP); Jun Anzai, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/137,168

(22) Filed: Apr. 20, 2023

(65) Prior Publication Data

US 2023/0262080 A1 Aug. 17, 2023

Related U.S. Application Data

(63) Continuation of application No. PCT/JP2021/036918, filed on Oct. 6, 2021.

(30) Foreign Application Priority Data

Oct. 26, 2020 (JP) .................. 2020-179027

(51) Int. Cl.
*H04L 9/40* (2022.01)
(52) U.S. Cl.
CPC ...... *H04L 63/1425* (2013.01); *H04L 63/1416* (2013.01)
(58) Field of Classification Search
CPC .................. H04L 63/1425; H04L 63/1416
See application file for complete search history.

(56) References Cited

U.S. PATENT DOCUMENTS

| 2015/0191135 A1 | 7/2015 | Ben Noon et al. |
| 2015/0195297 A1* | 7/2015 | Ben Noon .............. H04L 67/12 726/22 |

(Continued)

FOREIGN PATENT DOCUMENTS

| JP | 2004-046742 | 2/2004 |
| JP | 2015-136107 | 7/2015 |
| JP | 6382724 | 8/2018 |

OTHER PUBLICATIONS

International Search Report (ISR) from International Searching Authority (Japan Patent Office) in International Pat. Appl. No. PCT/JP2021/036918, dated Nov. 22, 2021, together with an English language translation.

(Continued)

*Primary Examiner* — Chau Le
(74) *Attorney, Agent, or Firm* — Greenblum & Bernstein, P.L.C.

(57) ABSTRACT

An information processing device includes: an obtainer that obtains, from an anomaly detection sensor that detects an anomaly in a network, a detection log related to the anomaly in the network and the detection time of the anomaly indicated in the detection log; an occurrence time determiner that determines the occurrence time of an attack on the network based on the obtained detection time, and records the determined occurrence time; and an end time determiner that determines the expected end time of the attack on the network based on the obtained detection log, and records the determined expected end time.

6 Claims, 9 Drawing Sheets

(56) References Cited

U.S. PATENT DOCUMENTS

| | | | | |
|---|---|---|---|---|
| 2016/0381066 A1* | 12/2016 | Galula | ................ | H04L 63/1441 |
| | | | | 726/23 |
| 2017/0013005 A1* | 1/2017 | Galula | ................ | H04L 63/1425 |
| 2020/0186560 A1* | 6/2020 | Ben-Noon | ............ | H04L 63/123 |
| 2021/0067528 A1* | 3/2021 | Tasaki | ..................... | G06F 21/55 |
| 2021/0360008 A1* | 11/2021 | Moriya | ............... | H04L 63/1416 |
| 2021/0397504 A1* | 12/2021 | Nagara | ............... | G06F 11/0739 |

OTHER PUBLICATIONS

Written Opinion (WO) from International Searching Authority (Japan Patent Office) in International Pat. Appl. No. PCT/JP2021/036918, dated Nov. 22, 2021, together with an English language translation.

\* cited by examiner

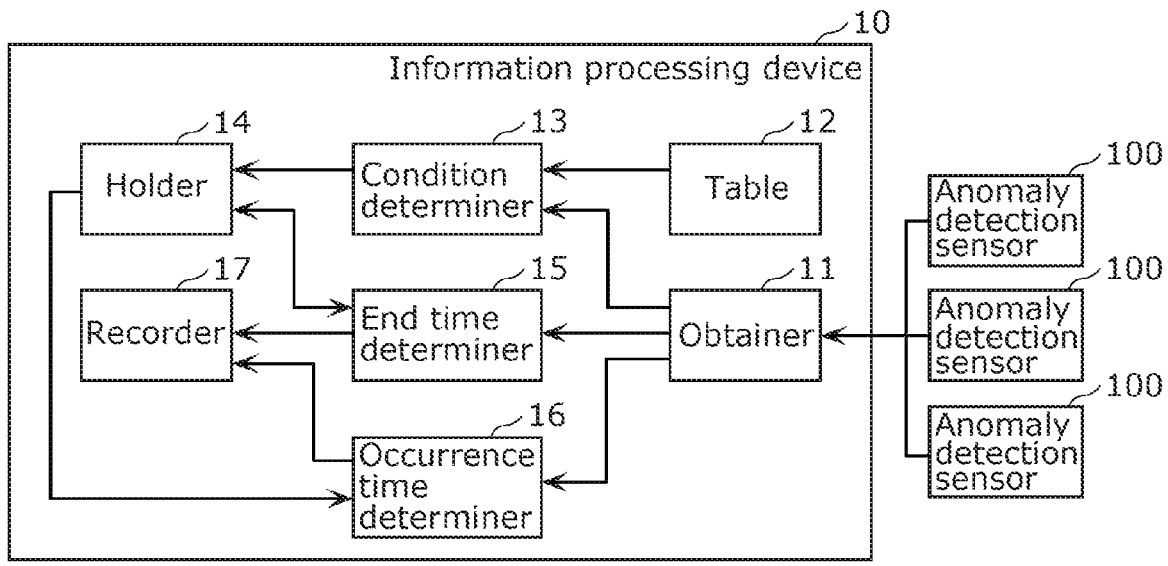

INFORMATION PROCESSING DEVICE AND INFORMATION PROCESSING METHOD

CROSS REFERENCE TO RELATED APPLICATIONS

This is a continuation application of PCT International Application No. PCT/JP2021/036918 filed on Oct. 6, 2021, designating the United States of America, which is based on and claims priority of Japanese Patent Application No. 2020-179027 filed on Oct. 26, 2020.

FIELD

The present disclosure relates to an information processing device and an information processing method.

BACKGROUND

Patent Literature (PTL) 1 discloses a vehicle safety system including a cyber watchman provided inside each of vehicles and a cyber hub provided outside each of the vehicles. The cyber watchman is connected to an in-vehicle communication network and obtains communication traffic data via the in-vehicle communication network. The cyber hub receives, from the cyber watchman, the communication traffic data obtained by the cyber watchman via, for example, a communication network such as the Internet. This enables the cyber hub to collect communication traffic data from each of the vehicles and obtain high-level information for protecting the vehicles against vehicle cyber attacks.

SUMMARY

The system disclosed in PTL 1 mentioned above can be improved upon.

In view of this, the present disclosure provides an information processing device and other related techniques capable of improving upon the above related art.

An information processing device according to one aspect of the present disclosure includes: an obtainer that obtains, from an anomaly detection sensor that detects an anomaly in a network, a detection log related to the anomaly in the network and the detection time of the anomaly indicated in the detection log; an occurrence time determiner that determines the occurrence time of an attack on the network based on the obtained detection time, and records the determined occurrence time; an end time determiner that determines the expected end time of the attack on the network based on the obtained detection log, and records the determined expected end time; a condition determiner that determines an end condition for the attack on the network based on the obtained detection log; and a holder that holds the determined end condition. When a new detection log is obtained before the held end condition is satisfied, the condition determiner further updates the held end condition or adds a new end condition to the holder based on the obtained new detection log. The end time determiner determines, as the expected end time, a time when the held end condition is satisfied, and when a plurality of end conditions are held by the holder, the end time determiner determines, as the expected end time, the latest time among times at each of which a different one of the plurality of end conditions is satisfied.

An information processing method according to one aspect of the present disclosure includes: obtaining, from an anomaly detection sensor that detects an anomaly in a network, a detection log related to the anomaly in the network and the detection time of the anomaly indicated in the detection log; determining the occurrence time of an attack on the network based on the obtained detection time, and recording the determined occurrence time; determining the expected end time of the attack on the network based on the obtained detection log, and recording the determined expected end time; determining an end condition for the attack on the network based on the obtained detection log; and holding the determined end condition. The determining of the end condition further includes: when a new detection log is obtained before the held end condition is satisfied, updating the held end condition or adding a new end condition based on the obtained new detection log. In the determining and recording of the expected end time, determining, as the expected end time, a time when the held end condition is satisfied, and when a plurality of end conditions are held, determining, as the expected end time, the latest time among times at each of which a different one of the plurality of end conditions is satisfied.

With the information processing device according to one aspect of the present disclosure and other related techniques, further improvement can be achieved.

BRIEF DESCRIPTION OF DRAWINGS

These and other advantages and features of the present disclosure will become apparent from the following description thereof taken in conjunction with the accompanying drawings that illustrate a specific embodiment of the present disclosure.

FIG. 1 is a configuration diagram illustrating one example of an information processing device according to an embodiment.

FIG. 2 is a diagram illustrating one example of a table according to the embodiment.

DESCRIPTION OF EMBODIMENT

Embodiment

Figure 3:
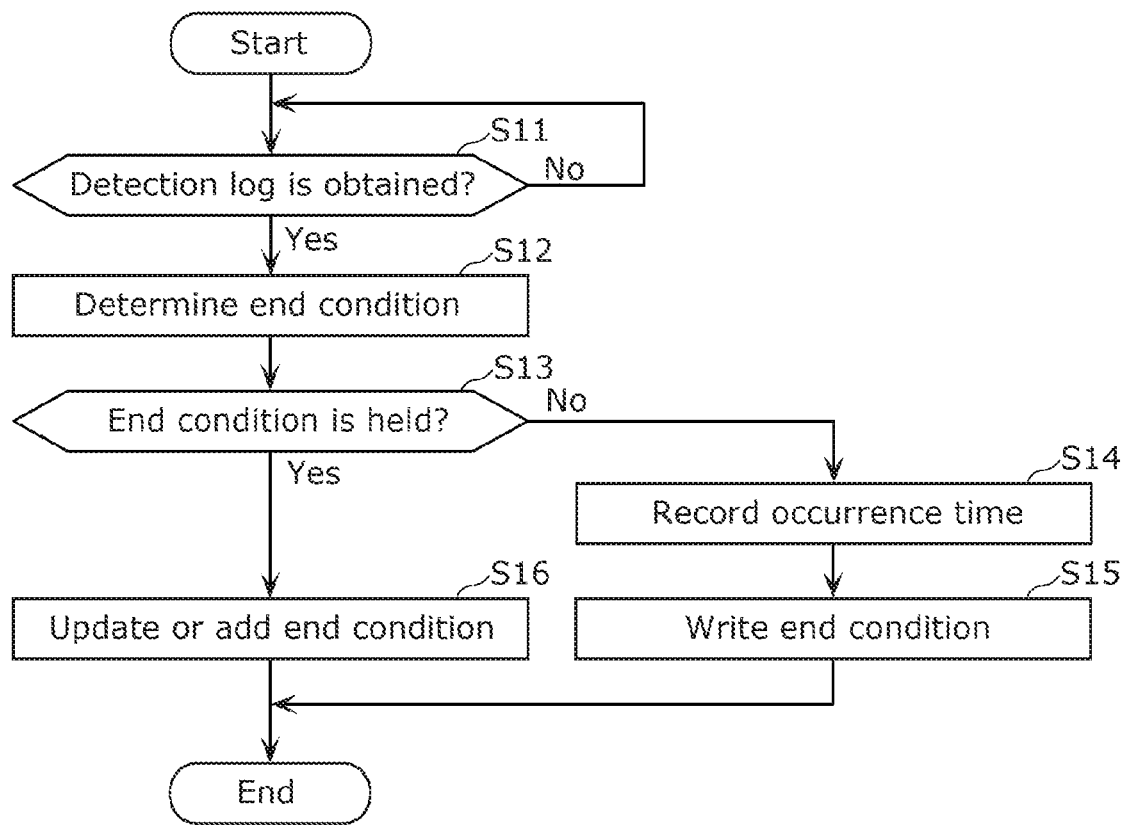
FIG. 3 is a flowchart illustrating one example of the operation of determining an end condition and recording an occurrence time performed by an information processing device according to the embodiment.

The system disclosed in PTL 1 mentioned above does not disclose a method for identifying a period (e.g., a period of time) in which an attack on an in-vehicle communication network (hereinafter also referred to as a network) occurred. Extracting such a network attack period from a massive amount of communication traffic data increases the processing load of a cyber hub (a server).

In view of this, the following describes an information processing device and other related techniques capable of reducing the processing load generated when extracting a network attack period.

[Configuration of Information Processing Device]

Hereinafter, an information processing device according to an embodiment will be described with reference to the drawings.

FIG. 1 is a configuration diagram illustrating one example of information processing device 10 according to an embodiment. FIG. 1 illustrates also anomaly detection sensor 100 communicably connected to information processing device 10.

Anomaly detection sensor 100 is a sensor that detects an anomaly in a mobile body which occurs when the mobile body is attacked. Specifically, anomaly detection sensor 100 is a sensor that detects an anomaly in a network (e.g., an in-vehicle network) which occurs when the network for the mobile body is attacked. An anomaly in a network may be an anomaly in a network communication or an anomaly in a device (e.g., an electronic control unit (ECU) or any other equivalent device) connected to the network. An anomaly in a network communication may be, for instance, an anomaly in the amount of network communication, an anomaly in a message ID included in a message flowing via the network (to be specific, an anomaly that a message ID is an unauthorized ID), or an anomaly in message transmission intervals. An anomaly in a device connected to the network is, for example, an anomaly such as malfunction of the device. Anomaly detection sensor 100 is, for example, an intrusion detection system (IDS) ECU and is connected to a network or a device connected to the network. When detecting an anomaly in the network, anomaly detection sensor 100 generates a detection log related to the anomaly and transmits the detection log to information processing device 10. The detection log includes, for instance, the type of the detected anomaly, information on anomaly detection sensor 100 that has detected the anomaly, and a detection time when the anomaly was detected. For example, a plurality of anomaly detection sensors 100 may be provided and each of the plurality of anomaly detection sensors 100 may transmit a detection log. The detection log need not include a detection time, and anomaly detection sensor 100 may transmit a detection time to information processing device 10 as information different from a detection log.

A mobile body is, for example, a vehicle, but is not limited to a vehicle and may be the mobility of, for instance, construction equipment, agricultural machinery, a vessel, a railroad train, or an aircraft.

Information processing device 10 is a computer that processes a detection log transmitted from anomaly detection sensor 100, to record occurrence time and expected end time of an attack on the network. Information processing device 10 is mounted on, for instance, a vehicle provided with anomaly detection sensor 100, and outputs the recorded occurrence time and expected end time to a server communicably connected to, for instance, the vehicle. Information processing device 10 includes a processor, memory, a communication interface, etc. The memory is, for instance, read-only memory (ROM) or random access memory (RAM), and can store a program executed by the processor. Information processing device 10 includes obtainer 11, table 12, condition determiner 13, holder 14, end time determiner 15, occurrence time determiner 16, and recorder 17. Condition determiner 13, end time determiner 15, and occurrence time determiner 16 are implemented by, for instance, a processor that executes the program stored in the memory. Obtainer 11 is implemented by a communication interface. Table 12 is stored in the memory. Holder 14 and recorder 17 are implemented by memory. Memory that stores the program, memory that stores table 12, and memory implementing holder 14 and recorder 17 may be separate memories or one memory. Information processing device 10 may be a server communicably connected to, for instance, a vehicle provided with anomaly detection sensor 100. The elements composing information processing device 10 may be separately placed in a plurality of servers, or information processing device 10 may be an information processing system.

Obtainer 11 obtains, from anomaly detection sensor 100 that detects an anomaly in a network, a detection log related to the anomaly in the network and the detection time of the anomaly indicated in the detection log. For example, obtainer 11 obtains a detection log from anomaly detection sensor 100 and obtains a detection time included in the detection log.

Table 12 is a table in which the type of an anomaly is associated in advance with the expected end time of a network attack caused when the anomaly occurred. Table 12 will be described with reference to FIG. 2.

FIG. 2 is a diagram illustrating one example of table 12 according to the embodiment.

In table 12, the type of an anomaly, a detection location indicating anomaly detection sensor 100 that has detected the anomaly, and the expected end time of a network attack caused when the anomaly occurred are associated with one another, for example. As illustrated in FIG. 2, an anomaly of type A is an anomaly detected by sensor 1, and a network attack is expected to be ended when x seconds elapse after the detection of the anomaly. An anomaly of type B is an anomaly detected by sensor 1, and a network attack is expected to be ended when x seconds elapse after the detection of the anomaly. An anomaly of type C is an anomaly detected by sensor 2, and a network attack is expected to be ended when y seconds elapse after the detection of the anomaly. For example, sensor 1 is anomaly detection sensor 100 that monitors network communications, and the anomaly of type A is an anomaly in the amount of network communication while the anomaly of type B is an anomaly in a message flowing via the network. For example, sensor 2 is anomaly detection sensor 100 that monitors a device connected to the network, and the anomaly of type C is, for instance, an anomaly such as malfunction of the device.

Such table 12 is used for determining an expected end condition (hereinafter also referred to as an end condition) for an attack on the network.

Condition determiner 13 determines the end condition of a network attack based on a detection log obtained by obtainer 11. The details of the operation performed by condition determiner 13 will be described later.

Holder 14 holds an end condition determined by condition determiner 13. Various types of anomalies may occur due to a network attack. In this case, one anomaly detection sensor 100 may generate a detection log for each of the anomalies that have occurred and obtainer 11 may obtain a plurality of detection logs from that one anomaly detection sensor 100. Alternatively, a plurality of anomaly detection sensors 100 may detect anomalies due to network attacks. In this case, obtainer 11 may obtain a plurality of detection logs from the plurality of anomaly detection sensors 100. Holder 14 may hold an end condition for each of the obtained detection logs. In other words, holder 14 may hold a plurality of end conditions.

End time determiner 15 determines the expected end time of a network attack based on a detection log obtained by obtainer 11, and records the determined expected end time on recorder 17. The details of the operation performed by end time determiner 15 will be described later.

Occurrence time determiner 16 determines the occurrence time of a network attack based on a detection time obtained by obtainer 11, and records the determined occurrence time on recorder 17. The details of the operation performed by occurrence time determiner 16 will be described later.

Recorder 17 records the occurrence time of a network attack determined by occurrence time determiner 16, and records the expected end time of the network attack determined by end time determiner 15. The recorded occurrence time and expected end time are output to a device (e.g., a server) connected to information processing device 10 and are used for attack analysis.

[Operations of Information Processing Device]

Next, operations performed by information processing device 10 will be described in detail with reference to FIG. 3 through FIG. 10.

First, the operation of determining an end condition and recording an occurrence time performed by information processing device 10 will be described with reference to FIG. 3.

FIG. 3 is a flowchart illustrating one example of the operation of determining an end condition and recording an occurrence time performed by information processing device 10 according to the embodiment.

First, condition determiner 13 determines whether obtainer 11 has obtained a detection log (step S11). When obtainer 11 has not obtained any detection log (No in step S11), condition determiner 13 repeats the process in step S11 until obtainer 11 obtains a detection log.

When obtainer 11 has obtained a detection log (Yes in step S11), condition determiner 13 determines the end condition of a network attack based on the obtained detection log (step S12). The operation of determining an end condition performed by condition determiner 13 will be described with reference to FIG. 4.

Figure 4:
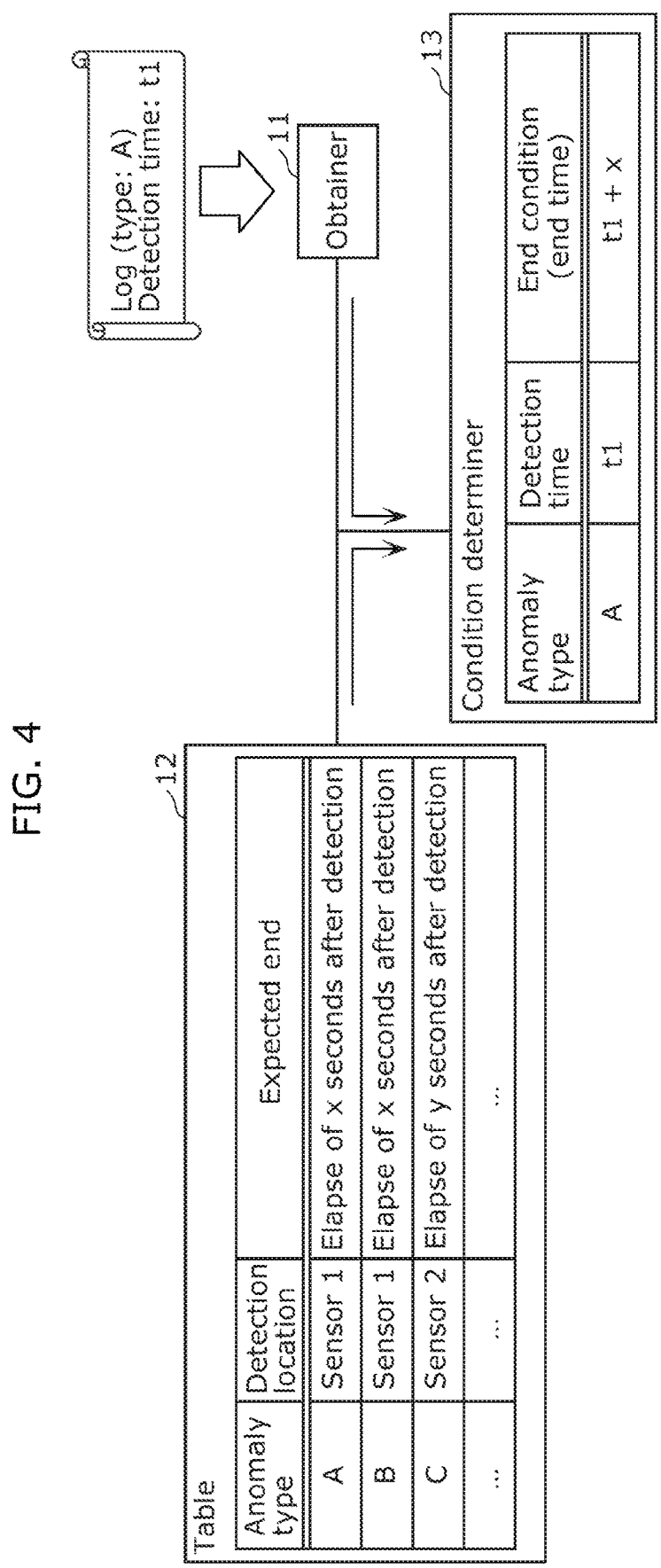
FIG. 4 is a diagram for explaining the operation of determining an end condition.

FIG. 4 is a diagram for explaining the operation of determining an end condition.

There is a case, for example, where the end condition of a network attack differs depending on the type of an anomaly indicated in a detection log. In this case, the expected end time of the network attack can be predetermined for each anomaly type, as shown in table 12. Condition determiner 13 can therefore determine the end condition based on table 12 and the type of an anomaly indicated in a detection log obtained by obtainer 11. Specifically, condition determiner 13 consults table 12 for the detection log obtained by obtainer 11, and determines the end condition of the network attack that caused the anomaly indicated in the detection log. As illustrated in FIG. 4, it is assumed that anomaly detection sensor 100 detects an anomaly of type A at time t1, and obtainer 11 obtains a detection log related to the anomaly of type A and detection time t1 of the anomaly. Since a network attack that caused the anomaly indicated in the detection log obtained by obtainer 11 is expected to end when x seconds elapse after the detection of the anomaly of type A, as indicated in table 12, condition determiner 13 determines time t1+x resulting from adding x seconds to detection time t1, as the end condition of the network attack.

There is a case, for example, where the end condition of a network attack differs depending on a parameter included in a detection log. In this case, it may be better that the end condition differs between the case where the amount of network communication as the parameter included in the detection log is large and the case where the amount of network communication is small. For example, when the amount of communication is large, condition determiner 13 sets a severe condition (e.g., determines the end condition such that the expected end time of the network attack is delayed). Condition determiner 13 may thus determine the end condition based on a parameter included in an obtained detection log.

There is a case, for example, where the end condition of a network attack differs depending on the obtainment status of other detection log when a detection log is obtained. For example, when other detection log indicating that an anomaly is occurring in a device connected to the network has already been obtained when a detection log is obtained, it may be better to set an end condition different from an end condition set for the case where no such other detection log has been obtained. When other detection log indicating that an anomaly is occurring in a device connected to the network has already been obtained, for example, condition determiner 13 sets a severe condition (e.g., determines the end condition such that the expected end time of the network attack is delayed). Condition determiner 13 may thus determine the end condition based on the obtainment status of other detection log when a detection log is obtained.

Referring back to the description with reference to FIG. 3, occurrence time determiner 16 determines, in the next step, whether any end condition is held by holder 14 (step S13).

When no end condition is held by holder 14 (No in step S13), occurrence time determiner 16 determines, as the occurrence time of the network attack, the detection time, which is obtained while no end condition is held by holder 14, of the anomaly indicated in the detection log, and records the determined occurrence time on recorder 17 (step S14). The operation of recording an occurrence time performed by occurrence time determiner 16 will be described with reference to FIG. 5.

Figure 5:
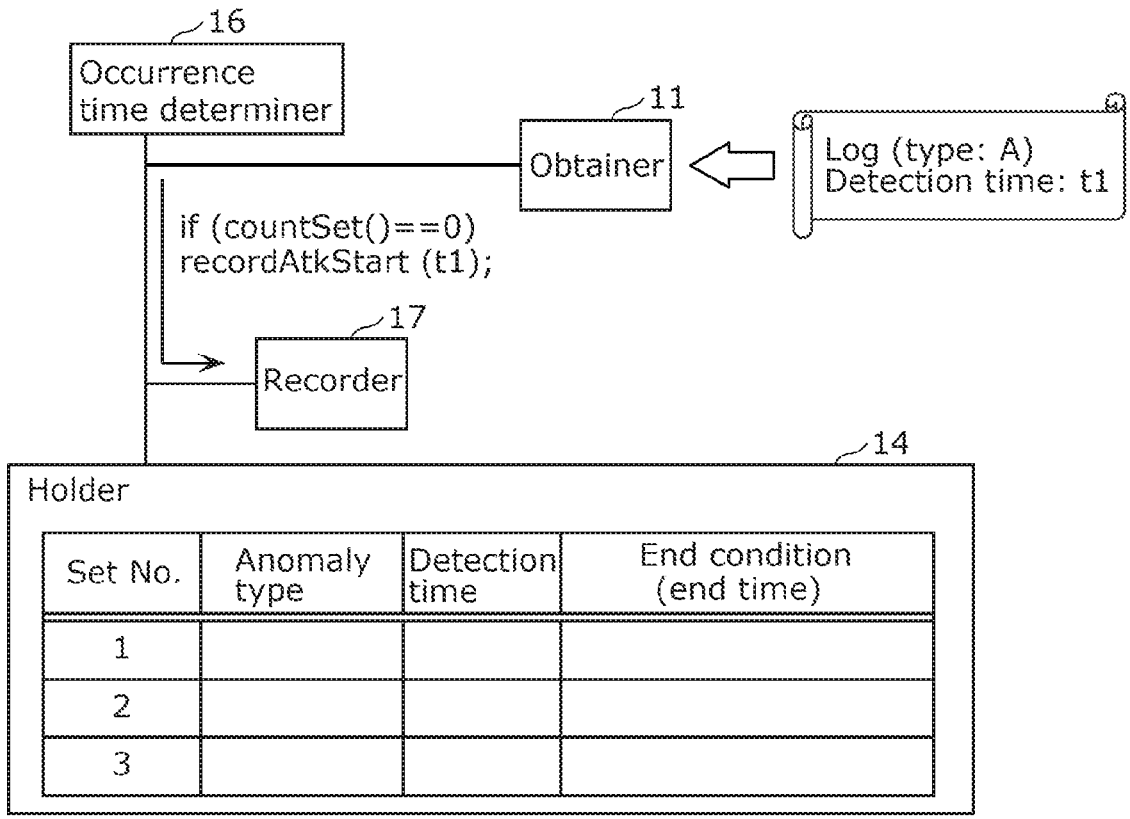
FIG. 5 is a diagram for explaining the operation of recording an occurrence time.

FIG. 5 is a diagram for explaining the operation of recording an occurrence time.

As illustrated in FIG. 5, it is assumed that no end condition is held by holder 14. Anomaly detection sensor 100 detects an anomaly of type A at time t1 and obtainer 11 obtains a detection log related to the anomaly of type A and detection time t1 of the anomaly. Since no end condition is held by holder 14, occurrence time determiner 16 determines, as the occurrence time of a network attack, detection time t1, which is obtained while no end condition is held by holder 14, of the anomaly indicated in the detection log, and records the determined occurrence time on recorder 17. Since a state in which no end condition is held by holder 14 is a state in which no network attack is being made, it is possible to determine, as the occurrence time of a network attack, the detection time of an anomaly indicated in a detection log obtained in that state.

Referring back to the description with reference to FIG. 3, condition determiner 13 writes, in the next step, the end condition determined in step S12 into holder 14 (step S15). The end condition is thus held by holder 14. The end condition held by holder 14 is removed from holder 14 when satisfied, which will be described later in detail.

When a new detection log is obtained in step S11 while an end condition is held by holder 14 (Yes in step S13), that is, after an end condition is written into holder 14 in step S15 and before the end condition is satisfied (i.e., before the end condition is removed), condition determiner 13 updates the held end condition or adds a new end condition to holder 14 based on the obtained new detection log (step S16). The operation of adding a new end condition performed by condition determiner 13 will be described with reference to FIG. 6, and the operation of updating an end condition performed by condition determiner 13 will be described with reference to FIG. 7.

Figure 6:
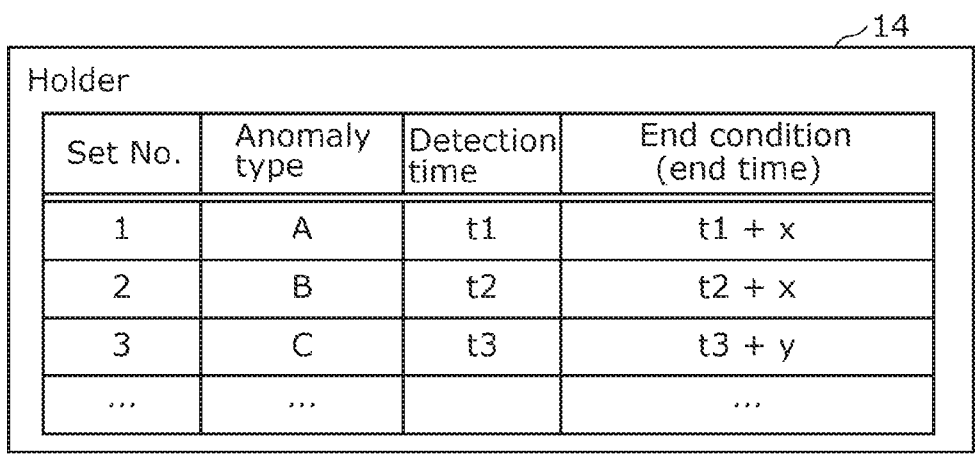
FIG. 6 is a diagram for explaining the operation of adding an end condition.

FIG. 6 is a diagram for explaining the operation of adding an end condition.

As illustrated in FIG. 6, it is assumed that anomaly detection sensor 100 detects an anomaly of type A at time t1 and end condition (i.e., end time) t1+x is held by holder 14. It is also assumed that after the detection of the anomaly of type A, anomaly detection sensor 100 detects an anomaly of type B at time t2 and a new detection log is obtained before end condition t1+x held by holder 14 is satisfied. In this case, condition determiner 13 determines new end condition t2+x based on the obtained new detection log (specifically by consulting table 12 for the new detection log), and adds new end condition t2+x to holder 14. It is further assumed that after the detection of the anomaly of type B, anomaly detection sensor 100 detects an anomaly of type C at time t3, and a new detection log is obtained before end conditions t1+x and t2+x held by holder 14 are satisfied. In this case, condition determiner 13 determines new end condition t3+y based on the obtained new 10 detection log (specifically by consulting table 12 for the new detection log), and adds new end condition t3+y to holder 14.

Figure 7:
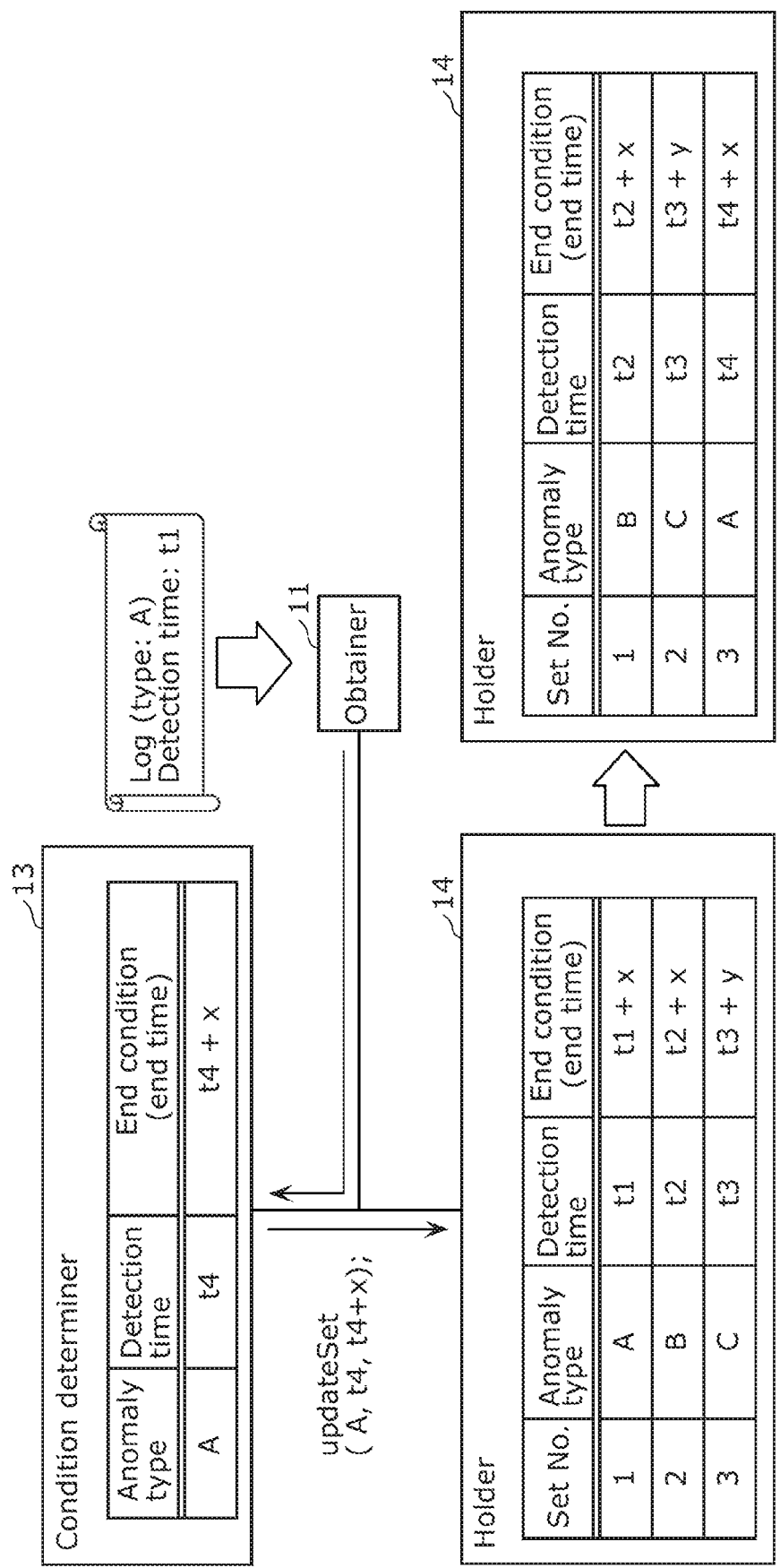
FIG. 7 is a diagram for explaining the operation of updating an end condition.

FIG. 7 is a diagram for explaining the operation of updating an end condition.

As illustrated at lower left in FIG. 7, it is assumed that end condition t1+x regarding an anomaly of type A, end condition t2+x regarding an anomaly of type B, and end condition t3+y regarding an anomaly of type C are already held by holder 14. It is also assumed that anomaly detection sensor 100 detects an anomaly of type A at time t4, and a new detection log is obtained before each of the end conditions held by holder 14 is satisfied. In this case, condition determiner 13 determines new end condition t4+x based on the obtained new log (specifically by consulting table 12 for the new detection log). Since end condition t4+x is an end condition regarding type A that is same as the type of end condition t1+x held by holder 14, condition determiner 13 updates end condition t1+x held by holder 14 to end condition t4+x.

Next, the operation of recording an expected end time performed by information processing device 10 will be described with reference to FIG. 8.

Figure 8:
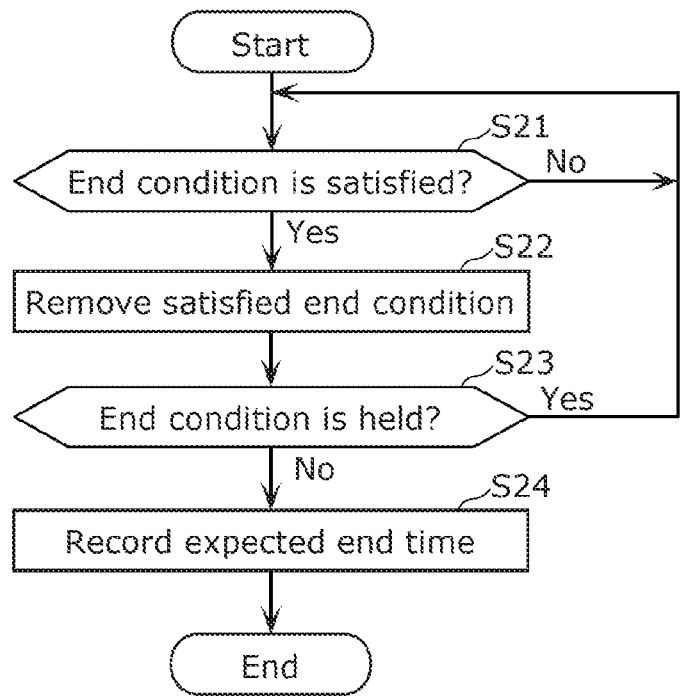
FIG. 8 is a flowchart illustrating one example of the operation of recording an expected end time performed by an information processing device according to the embodiment.

FIG. 8 is a flowchart illustrating one example of the operation of recording an expected end time performed by information processing device 10 according to the embodiment. The operation shown in FIG. 3 and the operation shown in FIG. 8 are performed in parallel.

End time determiner 15 determines whether an end condition held by holder 14 is satisfied (step S21). When the end condition held by holder 14 is not satisfied (No in step S21), end time determiner 15 repeats the process in step S21 until the end condition held by holder 14 is satisfied.

When the end condition held by holder 14 is satisfied (Yes in step S21), end time determiner 15 removes the satisfied end condition from holder 14 (step S22). The operation of removing a satisfied end condition performed by end time determiner 15 will be described with reference to FIG. 9.

Figure 9:
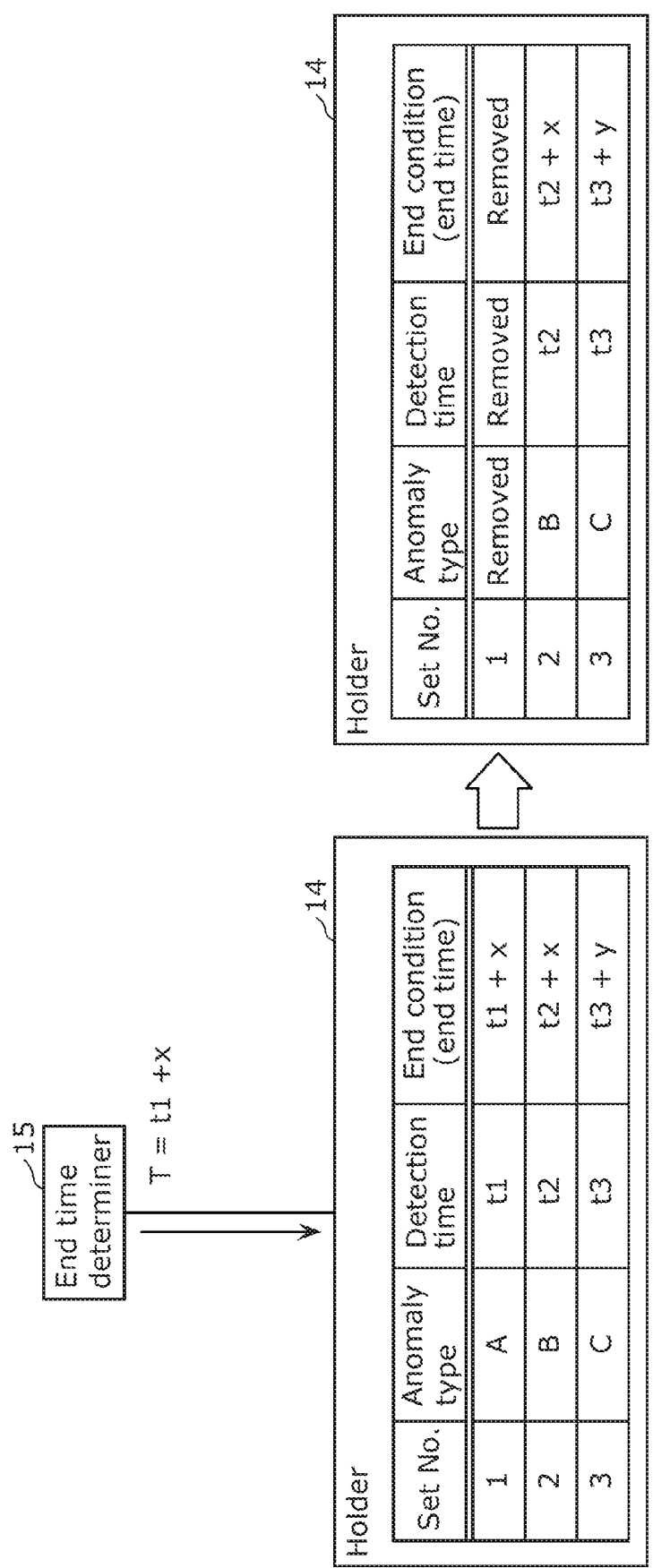
FIG. 9 is a diagram for explaining the operation of removing an end condition.

FIG. 9 is a diagram for explaining the operation of removing an end condition.

As illustrated at lower left in FIG. 9, it is assumed that end condition t1+x regarding an anomaly of type A, end condition t2+x regarding an anomaly of type B, and end condition t3+y regarding an anomaly of type C are already held by holder 14. When the time indicates t1+x and end condition t1+x is satisfied, end time determiner 15 removes satisfied end condition t1+x from holder 14.

Referring back to the description with reference to FIG. 8, end time determiner 15 determines, in the next step, whether any end condition is held by holder 14 (step S23). As illustrated at lower right in FIG. 9, when end conditions are held by holder 14 (Yes in step S23), processes in steps S21 and S22 are performed for each of the end conditions held by holder 14, and the processes in steps S21 through S23 are repeated until no end condition is held by holder 14.

When no end condition is held by holder 14 (No in step S23), end time determiner 15 determines, as the expected end time of the network attack, a time when the last satisfied (stated differently, last removed) end condition among the end conditions held by holder 14 is satisfied, and records the determined expected end time on recorder 17 (step S24). The operation of recording an expected end time performed by end time determiner 15 will be described with reference to FIG. 10.

Figure 10:
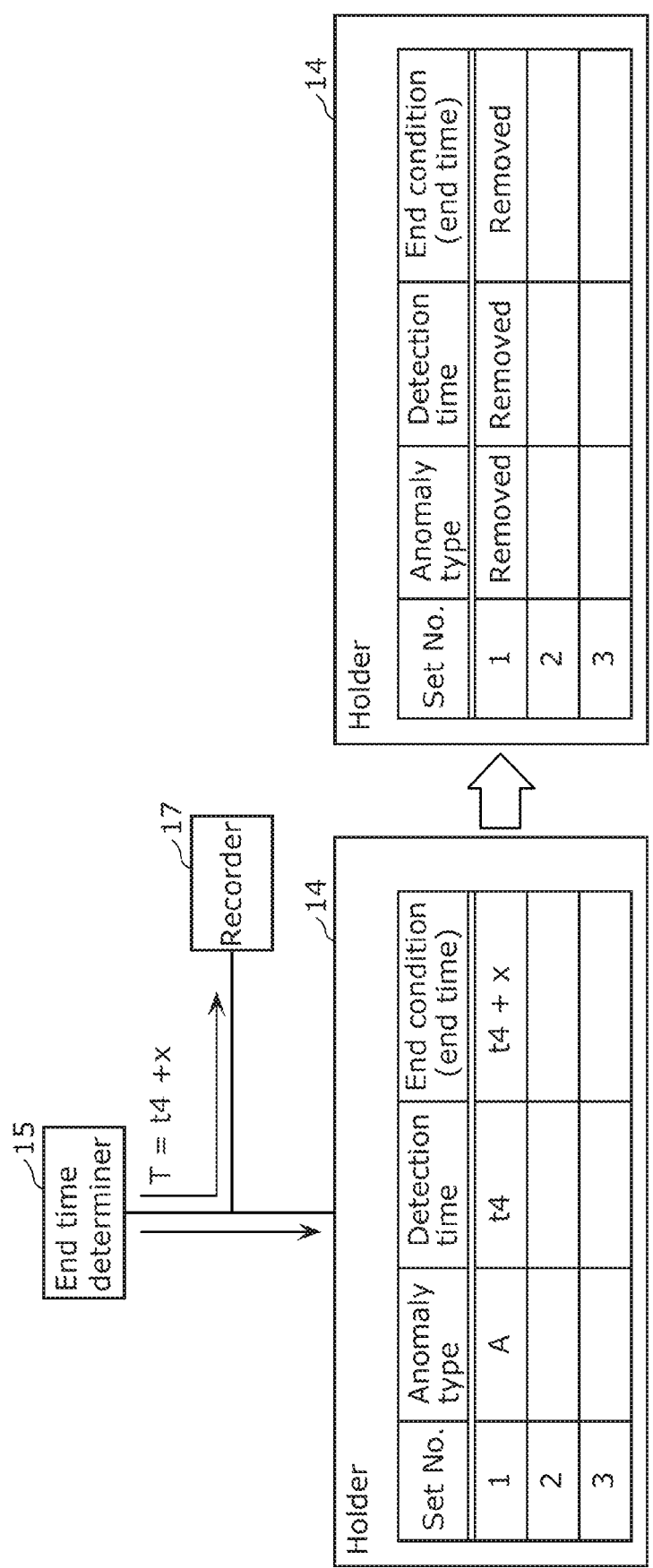
FIG. 10 is a diagram for explaining the operation of recording an expected end time.

FIG. 10 is a diagram for explaining the operation of recording an expected end time.

As illustrated at lower left in FIG. 10, it is assumed that end condition t4+x regarding an anomaly of type A is held by holder 14. When the time indicates t4+x and end condition t4+x is satisfied, end time determiner 15 removes satisfied end condition t4+x from holder 14. With this, holder 14 no longer holds any end conditions, as illustrated at lower right in FIG. 10, and end time determiner 15 determines, as the expected end time of a network attack, time t4+x when the last satisfied end condition t4+x is satisfied, and records expected end time t4+x on recorder 17.

End time determiner 15 thus determines, as the expected end time of a network attack, a time when a held end condition is satisfied. Specifically, when a plurality of end conditions are held by holder 14, end time determiner 15 determines, as the expected end time, a time when the last removed end condition is satisfied, that is, the latest time among times at each of which a different one of the plurality of end conditions is satisfied. When an end condition is held by holder 14 while no end condition is held by holder 14 and no new detection log is obtained before the held end condition is satisfied, end time determiner 15 determines, as the expected end time, a time when the held end condition is satisfied, and records the determined expected end time on recorder 17.

A time when an end condition is satisfied may be a time when a predetermined time elapses after a detection log is obtained, or a time when a counter, which counts up after a detection log is obtained, indicates a value greater than a predetermined threshold value, or a time when a predetermined detection log is obtained. The predetermined time may be determined, for example, in accordance with an anomaly type, for instance. The predetermined threshold value is determined in accordance with, for example, an anomaly type and the count-up cycle of the counter. The predetermined detection log may be, for example, a detection log that indicates normal and is regularly transmitted when anomaly detection sensor 100 does not detect any anomalies, and end time determiner 15 may determine, as the expected end time of a network attack, a time when a detection log indicating normal is obtained a predetermined number of times.

[Summary]

Information processing device 10 includes: obtainer 11 that obtains, from anomaly detection sensor 100 that detects an anomaly in a network, a detection log related to the anomaly in the network and the detection time of the anomaly indicated in the detection log; occurrence time determiner 16 that determines the occurrence time of an attack on the network based on the obtained detection time, and records the determined occurrence time; and end time determiner 15 that determines the expected end time of the attack on the network based on the obtained detection log, and records the determined expected end time.

With this, the occurrence time and expected end time of a network attack are automatically recorded based on a detection log and a detection time obtained from anomaly detection sensor 100. It is therefore possible to easily extract the period of the network attack based on the recorded occurrence time and expected end time. Accordingly, the processing load generated when extracting a network attack period can be reduced.

For example, information processing device 10 may further include: condition determiner 13 that determines an end condition for the attack on the network based on the obtained detection log; and holder 14 that holds the determined end condition. End time determiner 15 may determine, as the expected end time, a time when the held end condition is satisfied.

There is a case, for example, where the end condition of a network attack that caused an anomaly differs depending on the type of an anomaly indicated in a detection log. In view of this, by determining the end condition based on an obtained detection log and determining, as the expected end time of the network attack, a time when the end condition is satisfied, it is possible to determine the expected end time that is in accordance with the type of an anomaly indicated in the obtained detection log.

For example, when a new detection log is obtained before the held end condition is satisfied, condition determiner 13 may further update the held end condition or add a new end condition to holder 14 based on the obtained new detection log.

Various types of anomalies may occur due to network attacks. There is a case that before an end condition already held by holder 14 is satisfied, anomaly detection sensor 100 detects again an anomaly of the same type as or detects an anomaly of different type from an anomaly indicated in a detection log corresponding to the end condition already held by holder 14. In view of this, when anomaly detection sensor 100 detects an anomaly of the same type as an anomaly indicated in a detection log corresponding to an end condition already held by holder 14, the end condition is updated based on a new detection log related to the detected anomaly. Alternatively, when anomaly detection sensor 100 detects an anomaly of a different type from an anomaly indicated in a detection log corresponding to an end condition already held by holder 14, a new end condition corresponding to a new detection log related to the detected anomaly is added to holder 14. Accordingly, when a plurality of anomalies of different types or the same type occur due to network attacks, it is possible for holder 14 to manage end conditions regarding one or more anomalies caused by the network attacks.

For example, when a plurality of end conditions are held by holder 14, end time determiner 15 may determine, as the expected end time, the latest time among times at each of which a different one of the plurality of end conditions is satisfied.

With this, it is possible to determine the final expected end time of an attack that may cause various types of anomalies.

For example, end time determiner 15 may further remove a satisfied end condition from holder 14.

When a plurality of end conditions are held by holder 14, by sequentially removing, from holder 14, the plurality of end conditions starting from an end condition satisfied the earliest, it is possible to determine, as the expected end time of a network attack, a time when the last removed end condition is satisfied (i.e., the latest time among times at each of which a different one of the plurality of end conditions is satisfied). Moreover, an end condition corresponding to the attack made this time can be removed from holder 14 in preparation for future new attacks.

For example, occurrence time determiner 16 may determine, as the occurrence time, the detection time of the anomaly indicated in the detection log, where the detection time is obtained while the end condition is not held by holder 14.

With this, since a state in which no end condition is held by holder 14 is a state in which no network attack is being made, it is possible to determine, as the occurrence time of a network attack, the detection time of an anomaly indicated in a detection log obtained in that state.

For example, condition determiner 13 may determine the end condition based on the type of the anomaly indicated in the obtained detection log, a parameter included in the obtained detection log, or the obtainment status of other detection log when the detection log is obtained.

The end condition of a network attack may differ depending on, for example, the type of an anomaly indicated in a detection log. The end condition can be therefore determined based on the type of an anomaly indicated in a detection log. The end condition of a network attack may differ depending on, for example, a parameter included in a detection log. The end condition can be therefore determined based on a parameter included in a detection log. The end condition of a network attack may differ depending on, for example, the obtainment status of other detection log when a detection log is obtained. The end condition can be therefore determined based on the obtainment status of other detection log when a detection log is obtained.

For example, a time when the end condition is satisfied may be (i) a time when a predetermined time elapses after the detection log is obtained, (ii) a time when a counter, which counts up after the detection log is obtained, indicates a value greater than a predetermined threshold value, or (iii) a time when a predetermined detection log is obtained.

A time when the end condition is satisfied can be thus determined.

For example, information processing device 10 may output the recorded occurrence time and the recorded expected end time, or an instruction that is in accordance with the recorded occurrence time and the recorded expected end time.

For example, information processing device 10 outputs recorded occurrence time and expected end time to a device (e.g., a server) connected to information processing device 10, so that the device can utilize the output occurrence time and expected end time to derive or identify the occurrence period (continuation time) of a cyber attack with less processing load. Alternatively, information processing device 10 outputs, for example, an instruction, which is in accordance with recorded occurrence time and expected end time, to derive or identify the occurrence period of a cyber attack to a device connected to information processing device 10, so that the device can derive or identify the occurrence period of a cyber attack with less processing load.

Other Embodiments

As described above, the foregoing has described an embodiment as an example of techniques according to the present disclosure. The techniques according to the present disclosure are not limited to this example, and are applicable to embodiments to which changes, replacements, additions, omissions, etc. have been made where necessary. For example, a variation as described below is also included as an embodiment of the present disclosure.

For example, the above embodiment has described an example in which information processing device 10 includes table 12 and condition determiner 13, but information processing device 10 need not include table 12 and condition determiner 13. For example, an end condition may not be determined based on an obtained detection log, and a predetermined end condition may be held by holder 14.

The present disclosure can be realized not only as information processing device 10, but also as an information processing method that includes steps (processes) performed by each of elements included in information processing device 10.

Figure 11:
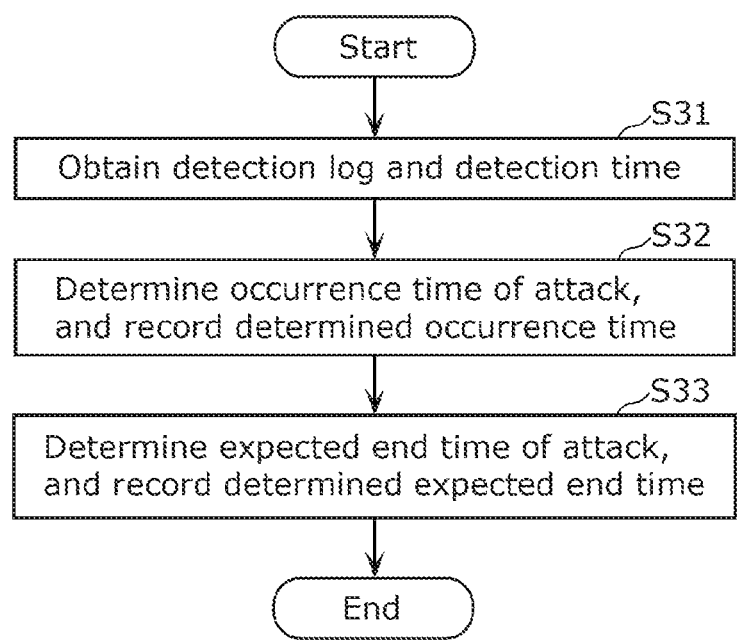
FIG. 11 is a flowchart illustrating one example of an information processing method according to another embodiment.

FIG. 11 is a flowchart illustrating one example of an information processing method according to another embodiment.

As illustrated in FIG. 9, the information processing method includes the following processes: obtaining, from anomaly detection sensor 100 that detects an anomaly in a network, a detection log related to the anomaly in the network and the detection time of the anomaly indicated in the detection log (step S31); determining the occurrence time of an attack on the network based on the obtained detection time, and recording the determined occurrence time (step S32); and determining the expected end time of the attack on the network based on the obtained detection log, and recording the determined expected end time (step S33).

For example, steps in the information processing method may be executed by a computer (computer system). The present disclosure can be realized as a program for causing a computer to execute the steps included in the information processing method.

Furthermore, the present disclosure can be realized as a non-transitory computer-readable recording medium such as a CD-ROM on which the program is recorded.

In the case where the present disclosure is realized as a program (software), for example, each of the steps is executed by the program being executed using hardware resources such as a CPU, memory, and an input/output circuit in the computer. In other words, each of the steps is executed by the CPU obtaining data from, for instance, the memory or the input/output circuit to perform computing, and outputting the computing result to, for instance, the memory or the input/output circuit.

Each of elements included in information processing device 10 according to the embodiment may be realized as a dedicated or general circuit.

Each of elements included in information processing device 10 according to the embodiment may be implemented by an integrated circuit (IC) through large-scale integration (LSI).

The integrated circuit is not realized limitedly through LSI and may be realized by a dedicated circuit or a general processor. It is also possible to employ a field-programmable gate array (FPGA) which is programmable or a reconfigurable processor in which the connections or settings of the circuit cells within the LSI can be reconfigured.

Furthermore, if other technologies that improve upon or are derived from semiconductor technology enable integration technology to replace LSI circuits, then naturally it is also possible to integrate each of elements included in information processing device 10 using that technology.

Forms obtained by various modifications to the foregoing embodiment that can be conceived by those skilled in the art as well as forms realized by discretionarily combining elements and functions in the embodiment within the scope of the essence of the present disclosure are also included in the present disclosure.

While embodiment and variations thereof have been described herein above, it is to be appreciated that various changes in form and detail may be made without departing from the spirit and scope of the present disclosure as presently or hereafter claimed.

Further Information about Technical Background to this Application

The disclosures of the following patent applications each including specification, drawings, and claims are incorporated herein by reference in their entirety: Japanese Patent Application No. 2020-179027 filed on Oct. 26, 2020, and PCT International Application No. PCT/JP2021/036918 filed on Oct. 6, 2021.

Industrial Applicability

The present disclosure is applicable to, for example, devices that monitor in-vehicle networks, for instance.

The invention claimed is:

1. An information processing device comprising:
an obtainer that obtains, from an anomaly detection sensor that detects an anomaly in a network, a detection log related to the anomaly in the network and a detection time of the anomaly indicated in the detection log;
an occurrence time determiner that determines an occurrence time of an attack on the network based on the detection time obtained, and records the occurrence time determined;
an end time determiner that determines an expected end time of the attack on the network based on the detection log obtained, and records the expected end time determined;
a condition determiner that determines an end condition for the attack on the network based on the detection log obtained; and
a holder that holds the end condition determined, wherein when a new detection log is obtained before the end condition held is satisfied, the condition determiner further updates the end condition held or adds a new end condition to the holder based on the new detection log obtained, and
the end time determiner determines, as the expected end time, a time when the end condition held is satisfied, and when a plurality of end conditions are held by the holder, the end time determiner determines, as the expected end time, a latest time among times at each of which a different one of the plurality of end conditions is satisfied.

2. The information processing device according to claim 1, wherein
the end time determiner further removes a satisfied end condition from the holder.

3. The information processing device according to claim 1, wherein
the occurrence time determiner determines, as the occurrence time, the detection time of the anomaly indicated in the detection log, the detection time being obtained while the end condition is not held by the holder.

4. The information processing device according to claim 1, wherein
the condition determiner determines the end condition based on a type of the anomaly indicated in the detection log obtained, a parameter included in the detection log obtained, or an obtainment status of an other detection log when the detection log is obtained.

5. The information processing device according to claim 1, wherein
a time when the end condition is satisfied is (i) a time when a predetermined time elapses after the detection log is obtained, (ii) a time when a counter, which counts up after the detection log is obtained, indicates a value greater than a predetermined threshold value, or (iii) a time when a predetermined detection log is obtained.

6. The information processing device according to claim 1, wherein
the information processing device outputs the occurrence time recorded and the expected end time recorded, or an instruction that is in accordance with the occurrence time recorded and the expected end time recorded.

* * * * *